United States Patent [19]

Byrnes et al.

[11] Patent Number: 5,176,433
[45] Date of Patent: Jan. 5, 1993

[54] VACUUM SERVO UNIT FOR USE IN TRACTION CONTROL

[75] Inventors: Sean Byrnes, Birmingham; Colin McDonald, Solihull; Ivan Mortimer, Solihull; Frank J. Bagley, Solihull, all of England

[73] Assignee: Lucas Industries public limited company, Birmingham, United Kingdom

[21] Appl. No.: 587,931

[22] Filed: Sep. 12, 1990

[30] Foreign Application Priority Data

Sep. 12, 1989 [GB] United Kingdom ............ 8920588

[51] Int. Cl.⁵ .................. B60T 8/32; B60T 13/57
[52] U.S. Cl. .................. 303/113.3; 91/369.3; 188/356; 303/114.3
[58] Field of Search .......... 303/113 TR, 113 TB, 303/113 SS, 114 PN, 115 VM, 118, 119 R, 119 SV, 100, 93, DIG. 6; 180/197; 91/376 R, 369.3, 369.2, 369.1, 1; 188/356, 357, 181 R, 181 A; 60/545, 547.1

[56] References Cited

U.S. PATENT DOCUMENTS

| | | | |
|---|---|---|---|
| 4,398,449 | 8/1983 | Takayama et al. | 91/369.3 X |
| 4,630,706 | 12/1986 | Takayama et al. | 303/114 PN |
| 4,667,471 | 5/1987 | Fulmer et al. | 91/32 |
| 4,729,284 | 3/1988 | Gautier | 91/376 R X |
| 4,759,255 | 7/1988 | Shimamura | 91/376 R X |
| 4,778,225 | 10/1988 | Rudolph et al. | 303/113 TB |
| 4,800,799 | 1/1989 | Nishii . | |
| 4,843,948 | 7/1989 | Sugiura et al. | 91/376 R X |
| 4,871,215 | 10/1989 | Takayama | 303/113 TB |
| 4,875,740 | 10/1989 | Takayama | 303/113 TB |
| 4,953,444 | 9/1990 | Cunningham et al. | 91/1 |

FOREIGN PATENT DOCUMENTS

| | | |
|---|---|---|
| 0171585 | 2/1986 | European Pat. Off. . |
| 0303470 | 2/1989 | European Pat. Off. . |
| 0327276 | 8/1989 | European Pat. Off. . |
| 0347583 | 12/1989 | European Pat. Off. . |
| 0379329 | 7/1990 | European Pat. Off. ..... 303/114 PN |
| 0417945 | 3/1991 | European Pat. Off. ...... 303/113 TB |
| 0212255 | 8/1990 | Japan ............... 303/113 TB |
| 8701637 | 3/1987 | Spain . |
| 8901433 | 2/1989 | World Int. Prop. O. . |

OTHER PUBLICATIONS

Patent Abstract of Japan-vol. 8, No. 276 Dec. 18, 1984, & JP-A-59 145652 Aug. 21, 1984.

Primary Examiner—Douglas C. Butler
Attorney, Agent, or Firm—Oblon, Spivak, McClelland, Maier & Neustadt

[57] ABSTRACT

The present specification discloses a servo unit for use in a vehicle braking system, the servo unit comprising a housing within which a flexible diaphragm separates a vacuum pressure chamber from an atmospheric pressure chamber. An actuator rod assembly extends through the housing and includes a valve assembly having a valve control piston which has a laterally extending key, the key being engageable with a fixed stop in the housing to limit the movement of the valve control piston and cause a balance in the valve assembly between the vacuum and atmospheric pressure. A solenoid valve is also provided, the solenoid valve being controllable to either connect a flexible passage member extending around the actuator rod assembly across the vacuum pressure chamber between the housing and the diaphragm in the region of the valve assembly, to the vacuum pressure chamber, or to connect both the flexible passage member and a bypass leading from the solenoid valve to the atmospheric pressure chamber, to the atmosphere. The bypass incorporates a one-way valve.

7 Claims, 6 Drawing Sheets

VACUUM SERVO UNIT FOR USE IN TRACTION CONTROL

The present invention relates to a vacuum servo unit for use in a vehicle braking system.

In particular the present invention relates to a servo unit of the type comprising a housing, the interior of which housing is divided into two chambers by a flexible diaphragm, one chamber being connectible to the exhaust manifold of an engine and thus then being subjected to a vacuum pressure, while the other chamber is connectible via a valve assembly to atmospheric pressure, so that the pressure difference across the diaphragm aids axial movement of a brake actuator rod assembly which extends through the housing and is connected to the diaphragm and to a master cylinder and brake pedal.

More particularly, the present invention relates to a servo unit of the above-described type wherein a key arrangement limits the movement of a control piston of the valve assembly relative to a power piston which is connected to the diaphragm. Such a construction is disclosed in Spanish Patent Application No. 551,919, filed by the assignee of the present application. In such a construction a key is located in a recess in the control piston and abuts against the servo housing to thereby set a predetermined retracted position for said control piston, in which set piston a valve connecting with the source of vacuum pressure is closed. By virtue of this arrangement a balance is achieved in the rest position of the servo unit, i.e. with the brakes released, such that any movement of the actuator rod assembly in the brake applying direction will immediately cause the valve assembly to introduce atmospheric pressure and actuate the servo unit.

Should such a servo unit be required to be used in a traction control system such as disclosed in our European Patent Application No. 88307406.4, bearing in mind its immediate response advantage, this would not be possible as the introduction of atmospheric pressure via a solenoid valve and the valve assembly would not actuate the servo unit in view of the balanced condition of the valve assembly, the balanced condition precluding the provision of an air flow path through the valve assembly.

The present invention thus aims to modify the above balanced type of servo unit for advantageous immediate response use in a traction control system.

According to the present invention there is provided a servo unit for use in a vehicle braking system, the servo unit comprising a housing within which a flexible diaphragm separates a vacuum pressure chamber from an atmospheric pressure chamber, an actuator rod assembly extending through the housing and including a valve assembly having a valve control piston which has a laterally extending key, said valve control piston together with a power piston connected to the flexible diaphragm, being engageable with a valve closure member, said valve control piston together with the valve closure member controlling the communication of the atmospheric pressure chamber with the atmosphere, and said power piston together with the valve closure member controlling the connection between the atmospheric pressure chamber and said vacuum pressure chamber, said laterally extending key being engageable with a fixed stop in the housing to limit the movement of the valve control piston and cause a balance to be set up in the valve assembly between the pressure in the vacuum pressure chamber and the pressure in the atmospheric pressure chamber when the actuator rod assembly is moved in a direction which would release the braking system, a solenoid valve being controllable to either connect a flexible passage member extending around the actuator rod assembly across the vacuum pressure chamber between the housing and the power piston, to said vacuum pressure chamber for normal braking by movement of the actuator rod assembly, or to connect both said flexible passage member and a bypass leading from the solenoid valve to the atmospheric pressure chamber, to the atmosphere for automatic brake application, said bypass incorporating a one-way valve to positively retain the pressure in the atmospheric pressure chamber under normal braking.

The provision of the bypass thus enables the atmospheric pressure chamber to be immediately connected to atmospheric pressure as and when traction control is required, whilst allowing for the advantageous immediate response of the balanced valve facility produced by the lateral key design of the valve control piston.

In one embodiment of the present invention the bypass is a pipe which extends externally of the housing. Alternatively the bypass may pass, at least partially, through the wall of the housing, or through the diaphragm within the flexible passage member. In a further embodiment an axially flexible tube extends between the diaphragm and a wall of the housing, across the vacuum pressure chamber, the tube connecting the solenoid valve with the atmospheric chamber of the housing. In a lightweight housing design which is strengthened by a number of axially extending tie bars, at least one tie bar extends through the axially flexible tube which is connected across the vacuum pressure chamber between the diaphragm and the wall of the housing. One end region of this flexible tube opens through the diaphragm into the atmospheric pressure chamber, whilst the other end region connects with the solenoid valve via a further pipe.

The present invention will now be further described, by way of example, with reference to the accompanying drawings, in which.

Figure 1:
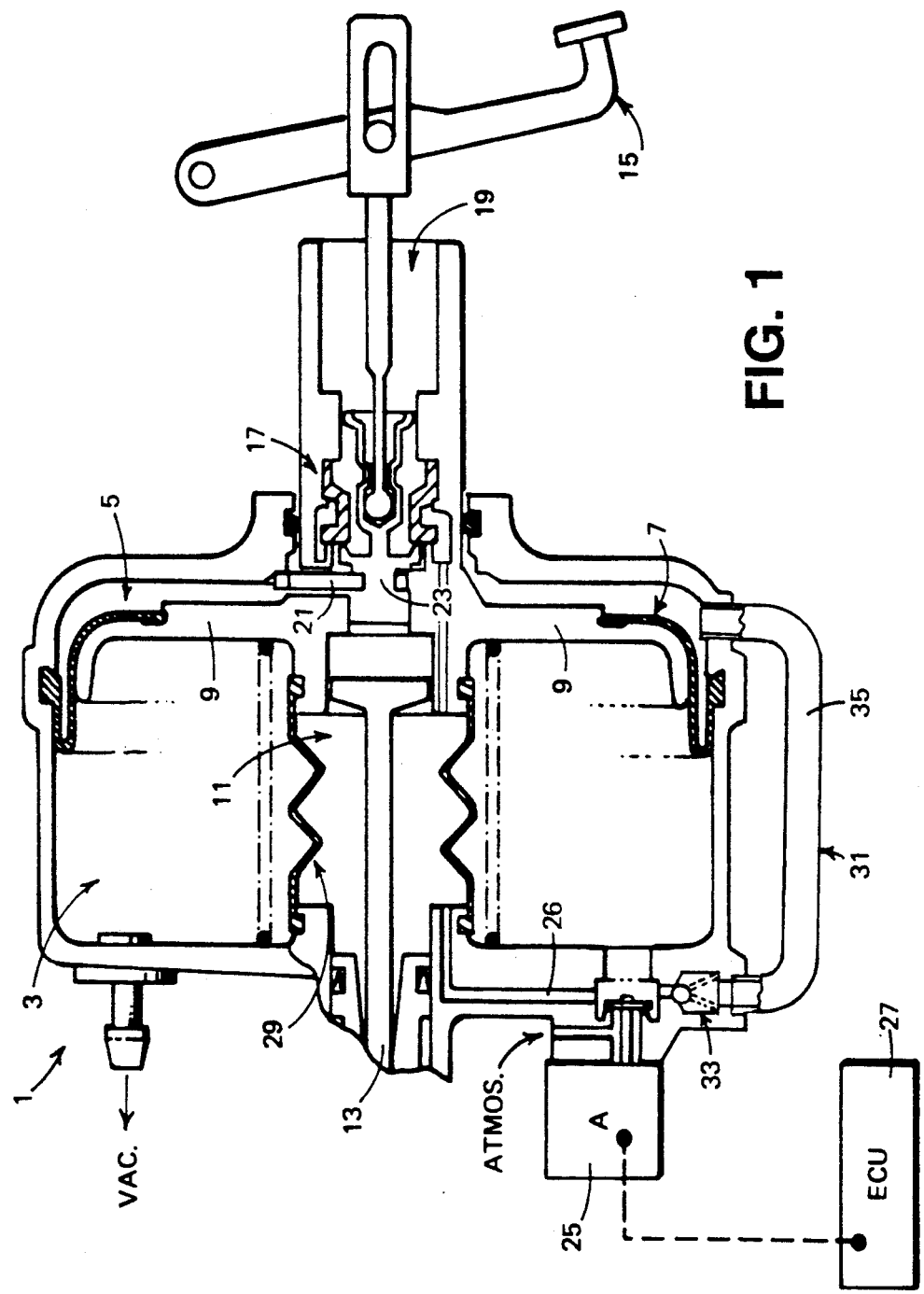
FIG. 1 is a cross-sectional view through one embodiment of the present invention.

The servo units illustrated in FIGS. 1 to 5 of the accompanying drawings comprise a housing 1 which is divided internally into a vacuum pressure chamber 3 and an atmospheric pressure chamber 5 by a flexible diaphragm 7. The diaphragm 7 includes a power piston 9 which is connected in an actuator rod assembly 11. The actuator rod assembly 11 extends through the housing 1 and projects from either side, one end region 13 being connected to a master cylinder (not shown) and the other end region being connected to a brake pedal 15. A valve assembly 17 controls the flow of air to the atmospheric pressure chamber 5, air normally entering the unit via inlet 19. This valve assembly 17 incorporates a key arrangement 21 schematically illustrated in FIGS. 1 to 5 and best seen in FIG. 6 of the accompanying drawings. The valve assembly 17 is constituted by an annular valve closure member 51 which is spring biassed by a spring 53 against an annular edge 55 of the power piston 9, said power piston 9 being connected to the diaphragm 7. Whilst one end of the spring 53 engages the valve closure member 51, the other end of the spring 53 engages on a shoulder of a brake actuator rod 57 forming part of the actuator rod assembly 11, said actuator rod 57 being connected to the brake pedal 15. The actuator rod 57 extends through the annular valve closure member 51 and is also coupled with the valve control piston 23, the key 21 extending laterally of the control piston 23 through a slot 59 in the wall of the power piston, and engaging against a stop or shoulder 61 in the wall of the housing 1 when the servo is in the rest position, the shoulder and key determining the rest position of the control piston 23. The key 21 limits the available movement of the control piston 23 relative to the servo housing 1 and results in a balanced condition when the brakes are released and the servo unit is at rest. In this balanced condition an annular edge 63 of the control piston 23 engages the valve closure member 51 and forms a closed atmospheric pressure valve preventing atmospheric pressure from entering the atmospheric pressure chamber 5 through the annular closure member 51 and the slot 59. Also, said annular edge 55 of the power piston 9 engages the closure member 51 radially outside the annular edge 63 to form a closed vacuum pressure valve, a passage 65 leading through the power piston 9 from the vacuum pressure chamber 3 to a location radially outside the annular edge 55. With this construction both the vacuum pressure valve 55,51 and the atmospheric pressure valve 63,51 are always closed when the servo unit is at rest. In this way any movement of the actuator rod 57 in a brake applying direction will open the atmospheric pressure valve 63,51 with the immediate effect of atmospheric pressure entering the atmospheric pressure chamber 5 to assist with the braking.

To provide for traction control independent of normal braking via the brake pedal 15, a solenoid valve 25 is provided in the wall of the housing 1, the solenoid valve 25 being controlled by an electronic control unit 27 which monitors speed and torque at the vehicle wheels. For normal braking the solenoid valve 25 opens a passage 26 between the vacuum pressure chamber 3 and an axially flexible passage member 29 which extends from the power piston 9 to the wall of the housing, across the vacuum pressure chamber 3 and around the actuator rod assembly 11. When traction control is required the solenoid valve 25 closes the passage 26 to the vacuum pressure chamber 3, and opens the passage 26 to the atmosphere. Thus atmospheric pressure is fed to the axially flexible passage member 29. However, due to the balanced condition of the valve assembly 17 this atmospheric pressure cannot pass to the atmospheric pressure chamber 5 as can occur in the servo unit of our European Patent Application No. 88307406.4. To solve this situation a bypass 35, incorporating a one-way valve 33, extends from the solenoid valve 25 to the atmospheric pressure chamber 5 so that when traction control is required, the bypass 31 is opened to allow atmospheric pressure to be introduced into the atmospheric pressure chamber 5. The resulting initial movement of the diaphragm 7 and thus the power piston 9, upsets the balanced condition of valve assembly 17 so that the vacuum valve 55, 51 of the valve assembly 17 opens so as to allow air under pressure to also flow from the axially flexible passage member 29 to the atmospheric pressure chamber 5 via the passage 65 and the open valve 55 of the valve assembly 17, resulting in the brakes being actuated. The one-way valve 33 retains the pressure in the atmospheric pressure chamber 5 during normal braking when valve assembly 17 opens to allow air under atmospheric pressure to enter the atmospheric pressure chamber 5 via inlet 19.

In FIG. 1, the bypass 31 is a pipe 35 which extends externally of the housing.

Figure 2:
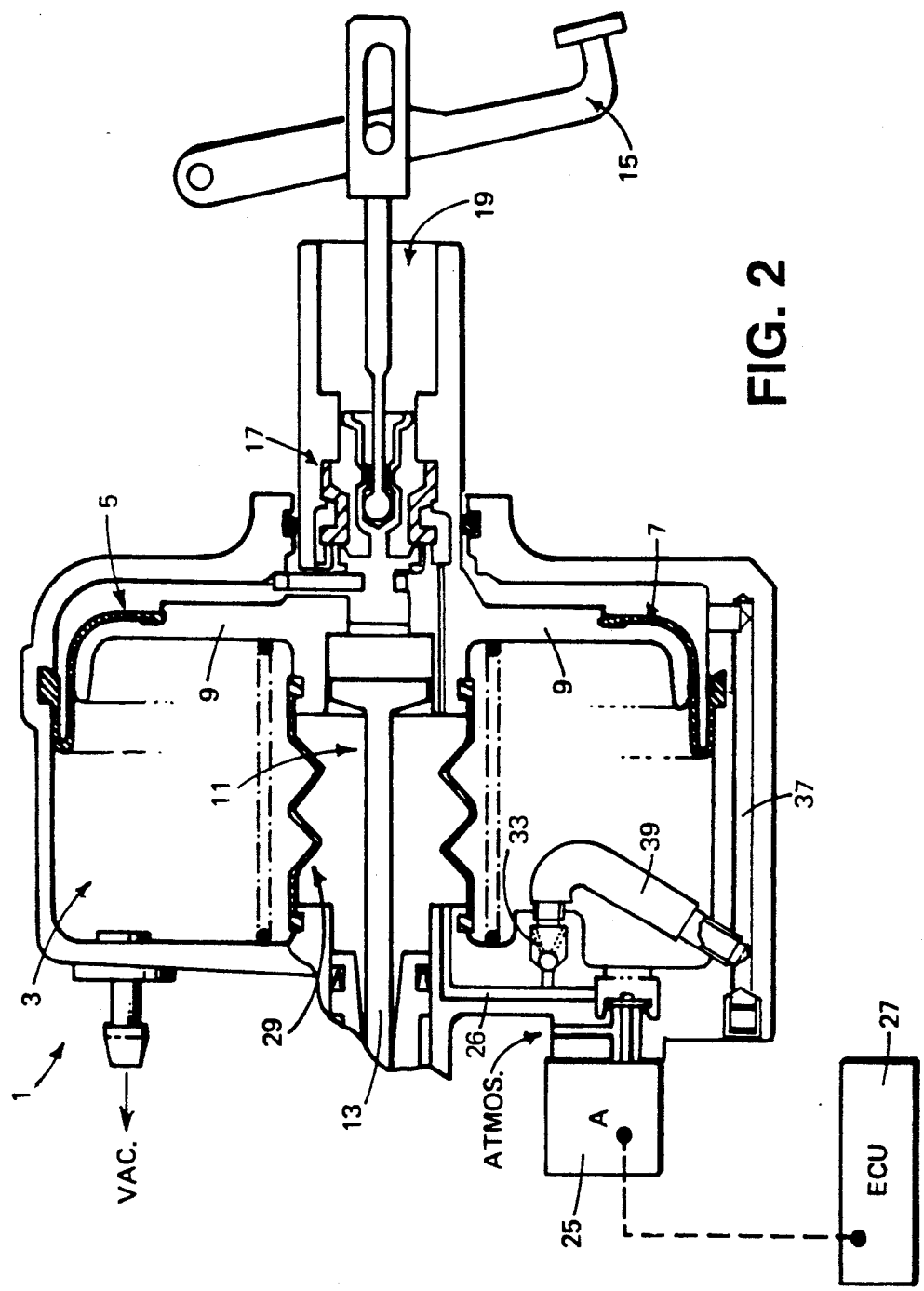
FIG. 2 is a cross-sectional view through another embodiment of the present invention.

In FIG. 2, the bypass 31 has a section 37 which extends through the wall of the housing 1, this section 37 being connected by a pipe 39 in the vacuum pressure chamber 3 to the one-way valve 33.

Figure 3:
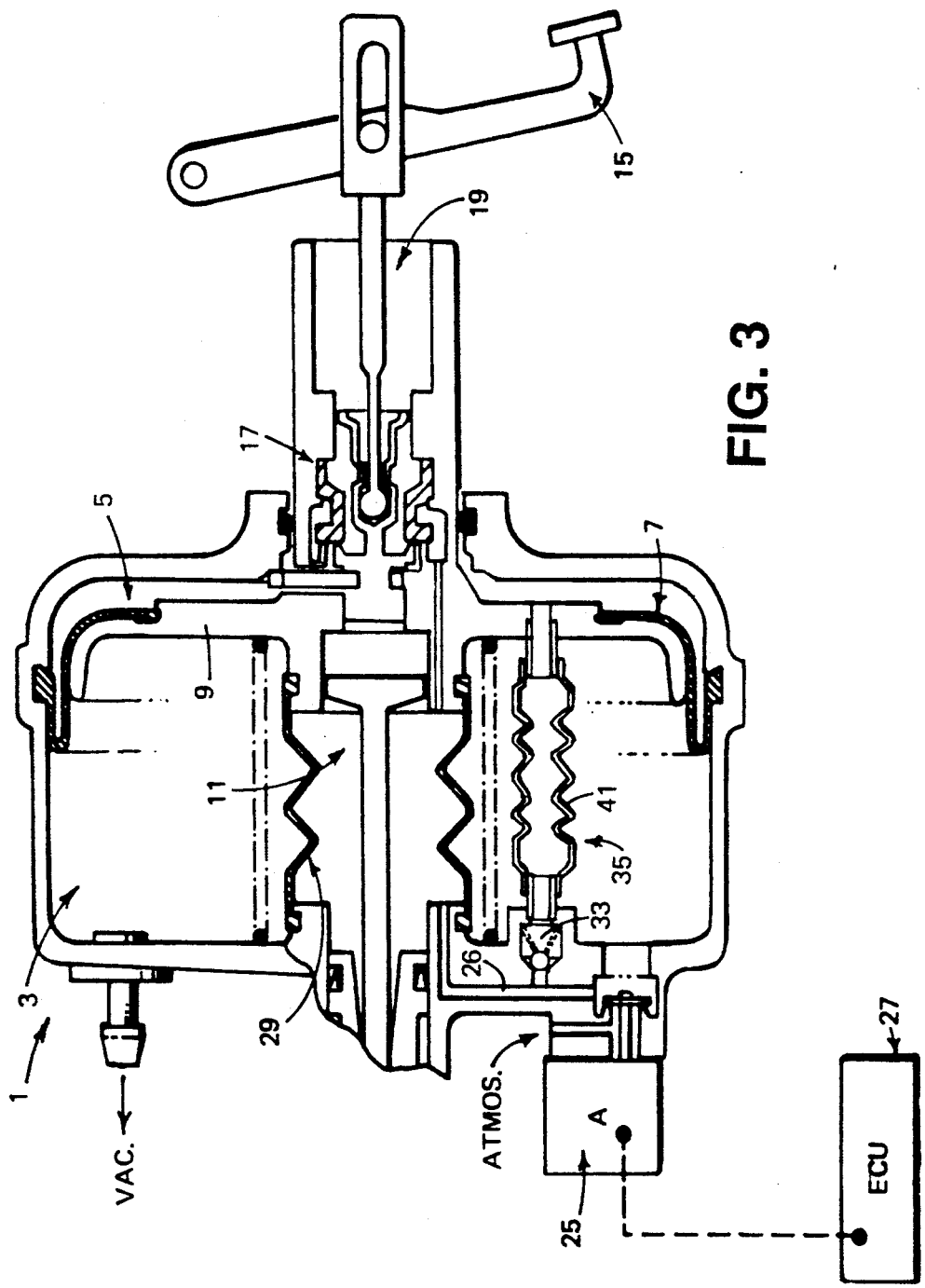
FIG. 3 is a cross-sectional view through a further embodiment of the present invention.

In FIG. 3, the bypass 31 is formed by an axially flexible tube 41 which extends across the vacuum pressure chamber 3 from the diaphragm 7 to the wall of the housing 1 adjacent to the solenoid valve 25, the tube 41 flexing as the diaphragm 7 moves. The tube 41 connects, through the diaphragm 7, with the atmospheric pressure chamber 5.

Figure 4:
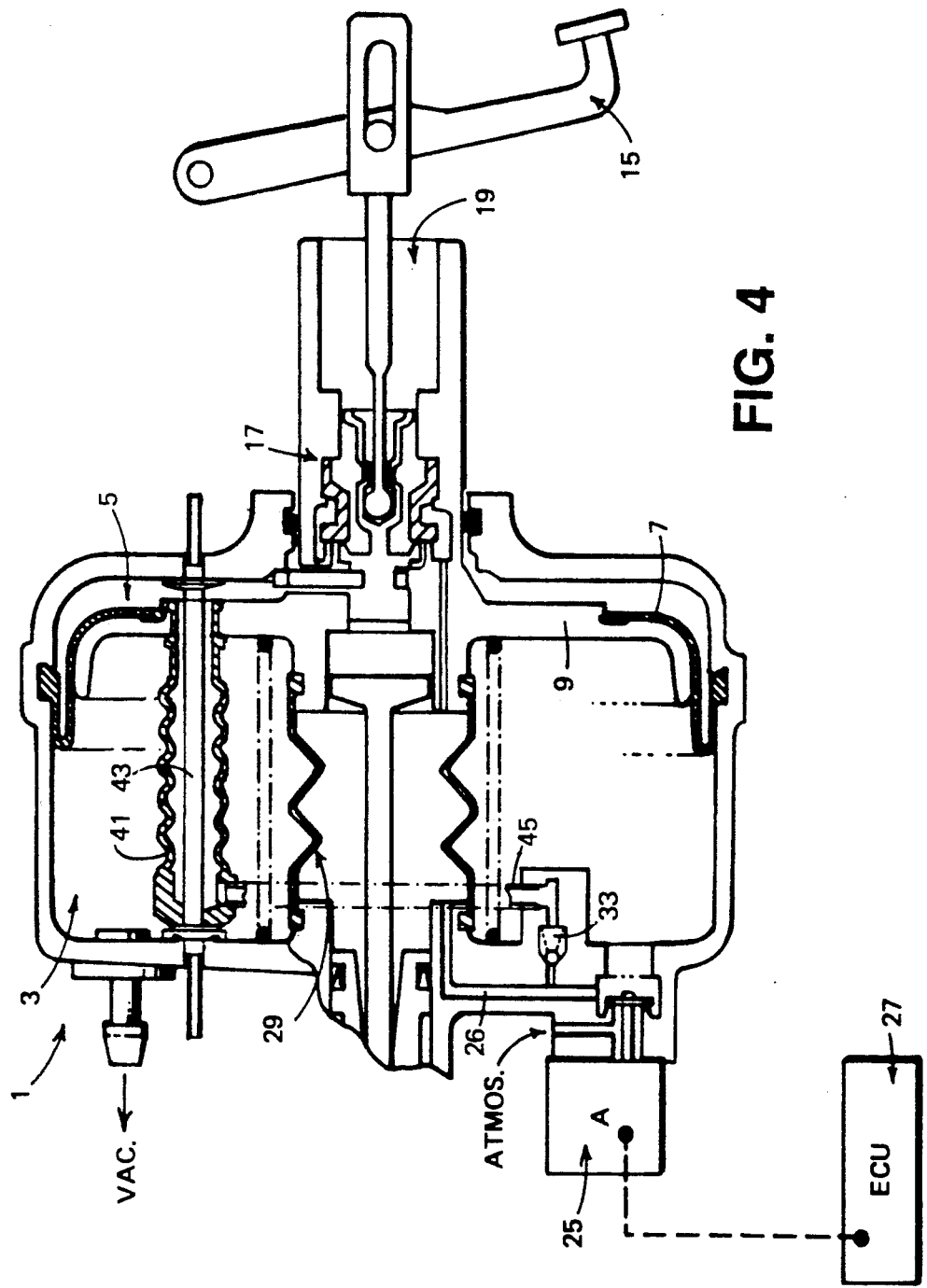
FIG. 4 is a cross-sectional view through a still further embodiment of the present invention.

A modified form of the embodiment of FIG. 3 is shown in FIG. 4, the housing 1 of the embodiment of FIG. 4 being of a lightweight design and requiring axial tie bars 43 to strengthen its construction. One of these tie bars 43 extends through an axially flexible tube 41, the tube 41 connecting, through the diaphragm 7, with the atmospheric pressure chamber 5, and by a further pipe 45 with the one-way valve 33 and solenoid valve 25.

Figure 5:
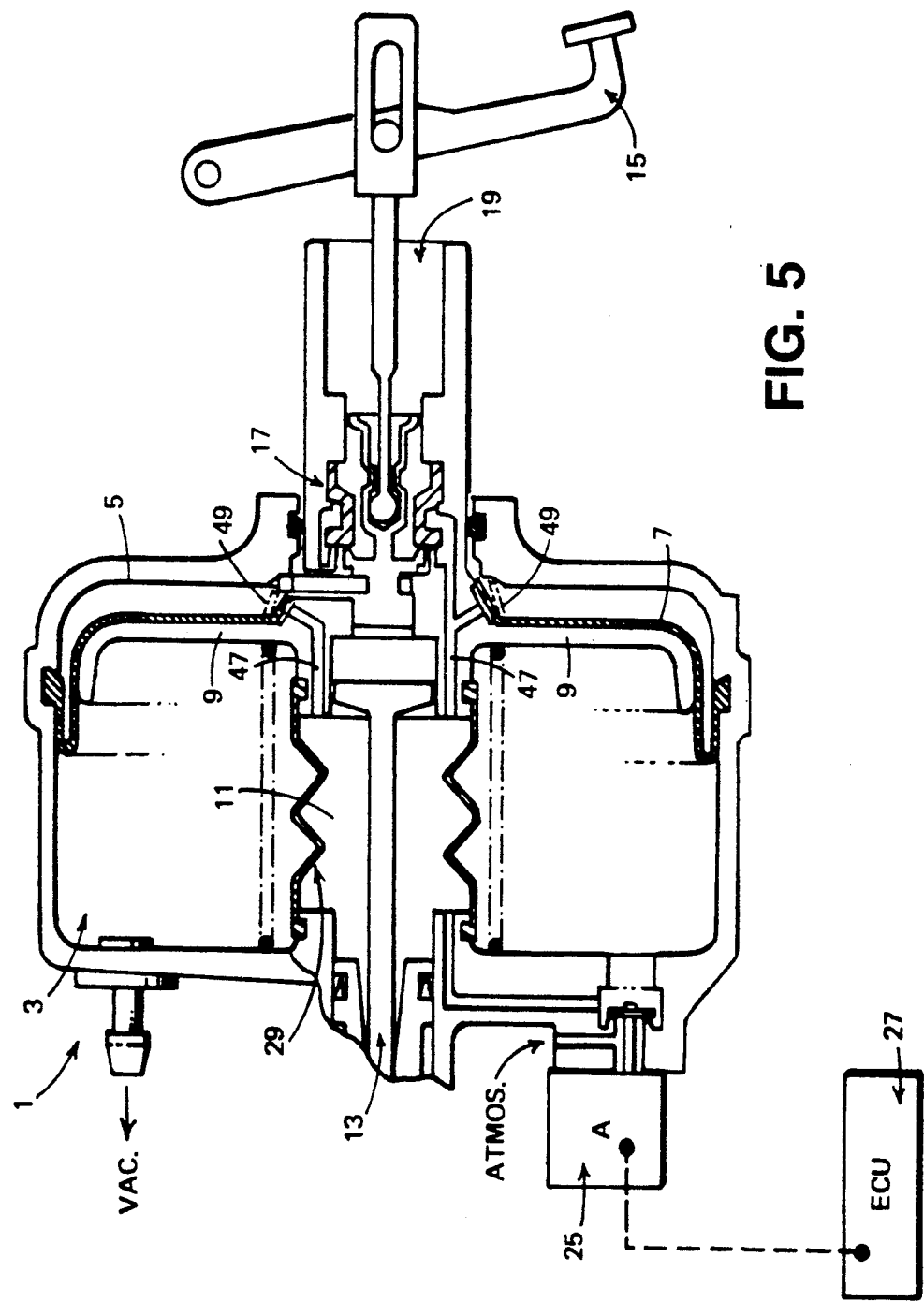
FIG. 5 is a cross-sectional view through a still further embodiment of the present invention.
Figure 6:
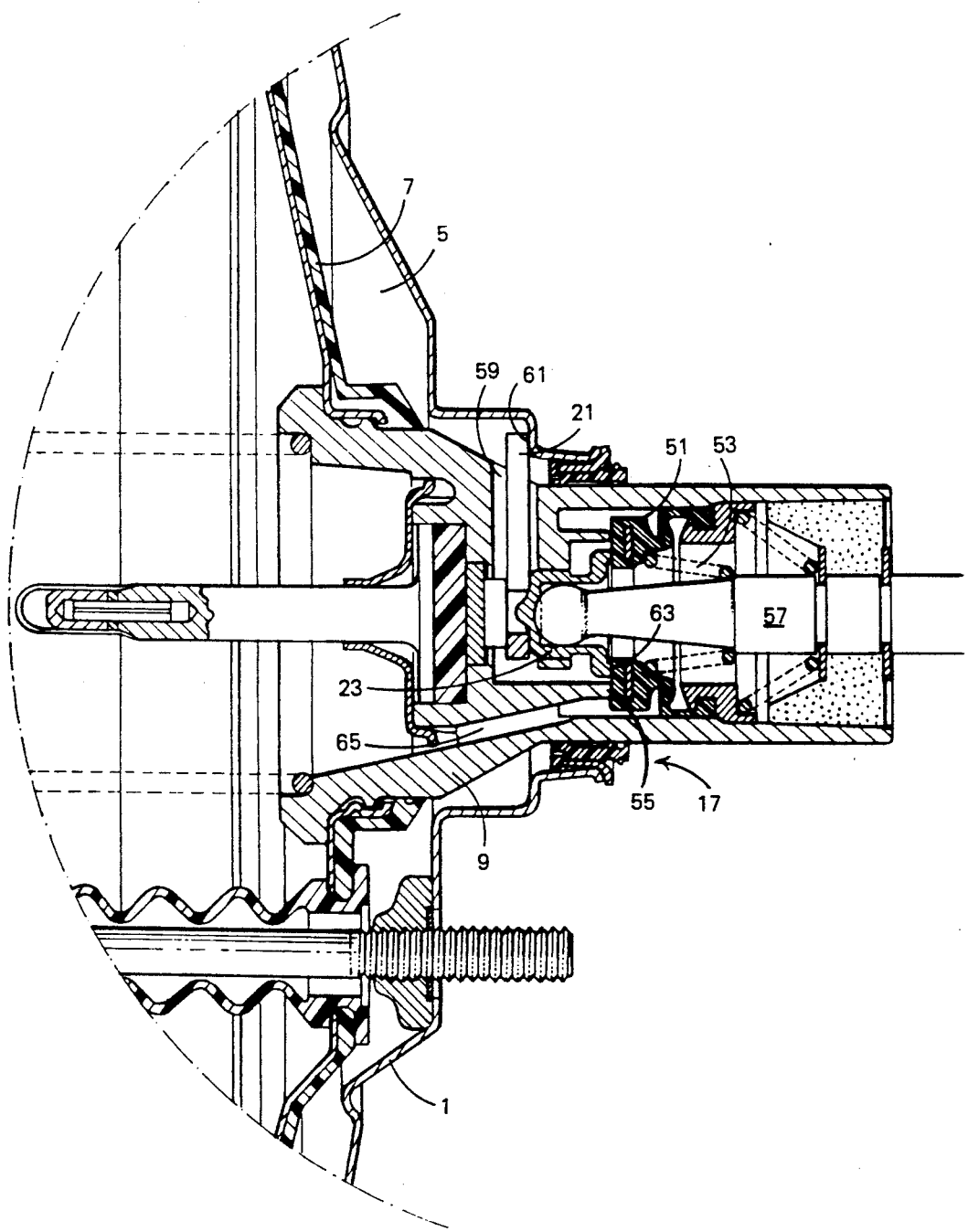
FIG. 6 is an enlarged detailed view illustrating the valve assembly of the embodiments of FIGS. 1 to 5.

A still further embodiment of the present invention is shown in FIG. 5 of the accompanying drawings, the bypass 35 being provided by passages 47 which extend through the power piston 9 connecting the flexible passage member 29 to the atmospheric pressure chamber 5. Thus, when traction control is required, the solenoid valve 25 opens the flexible passage member 29 to the atmosphere so that atmospheric pressure immediately passes to the atmospheric pressure chamber 5 to actuate the servo unit and apply the brakes. For normal braking the flexible passage member 29 is connected to the vacuum pressure chamber 3 via the solenoid valve 25, flap valves 49, i.e. the said one-way valve, being closed to prevent the chambers 3,5 from interconnecting.

The present invention thus provides a servo unit with immediate response for normal braking, and with a traction control facility.

We claim:

1. A servo unit for use in a vehicle braking system, the servo unit comprising a housing within which a flexible diaphragm separates a vacuum pressure chamber from an atmospheric pressure chamber, an actuator rod assembly extending through the housing and including a pedal for normal operation of brakes and a valve assembly having a valve control piston which has a laterally extending key, said valve control piston together with a power piston connected to the flexible diaphragm, being engageable with a valve closure member, said valve control piston together with the valve closure member controlling a first communication of the atmospheric pressure chamber with the atmosphere, and said power piston together with the valve closure member controlling a second communication between said atmospheric pressure chamber and said vacuum pressure chamber, said laterally extending key being engageable with a fixed stop in the housing to limit movement of the valve control piston and cause a balance to be set up on the valve assembly between the pressure in the vacuum pressure chamber and the pressure in that atmospheric pressure chamber when the actuator rod assembly is moved in a direction which would release the braking system, a solenoid valve being controllable in one condition to connect a flexible passage member extending around said actuator rod assembly across the vacuum pressure chamber between the housing and the power piston, to said vacuum pressure chamber for normal braking upon movement of the actuator rod assembly, or in response to a signal, being controllable to connect both said flexible passage member and a bypass leading from the solenoid valve to the atmospheric pressure chamber, to the atmosphere independently of said pedal for automatic brake application, said bypass incorporating a one-way valve to positively retain the pressure in the atmospheric pressure chamber under normal braking.

2. A servo unit according to claim 1, wherein the bypass is formed by a pipe which extends at least in part externally of the housing.

3. A servo unit according to claim 1, wherein the bypass extends, at least partially through a wall of the housing.

4. A servo unit according to claim 1, wherein the bypass extends through the diaphragm and connects the flexible passage member with the atmospheric pressure chamber.

5. A servo unit according to claim 1, wherein the bypass is formed by an axially flexible tube which extends between the diaphragm and a wall of the housing across the vacuum pressure chamber, the tube connecting the solenoid valve with the atmospheric chamber of the housing.

6. A servo unit according to claim 1, wherein at least one tie bar extends across the housing through the diaphragm, the bypass being formed by an axially flexible hollow tube through which a tie bar extends, the tube being connected across the vacuum pressure chamber between the diaphragm and a wall of the housing, one end region of the tube communicating with the atmospheric pressure chamber through the diaphragm, while the other end region of the tube communicates with the solenoid valve via a further pipe.

7. The servo unit in accordance with claim 1, wherein solenoid valve is responsive to a traction control signal to connect said atmospheric chamber to pressure independently of said pedal.

* * * * *